United States Patent
Corscadden et al.

(10) Patent No.: US 10,421,917 B2
(45) Date of Patent: Sep. 24, 2019

(54) STEAMLESS HYDROCARBON PROCESSING (UPGRADING) FACILITY WITH MULTIPLE AND INTEGRATED USES OF NON-CONDENSABLE GAS FOR HYDROCARBON PROCESSING

(71) Applicant: MEG ENERGY CORP., Calgary (CA)

(72) Inventors: Tom Corscadden, Calgary (CA); Frank David Guffey, Laramie, WY (US); Greg Diduch, Calgary (CA); Jim Kearns, Calgary (CA); Darius Remesat, Calgary (CA)

(73) Assignee: MEG ENERGY CORP., Calgary (CA)

( * ) Notice: Subject to any disclaimer, the term of this patent is extended or adjusted under 35 U.S.C. 154(b) by 0 days.

(21) Appl. No.: 15/821,628

(22) Filed: Nov. 22, 2017

(65) Prior Publication Data

US 2019/0153330 A1    May 23, 2019

(51) Int. Cl.

| | |
|---|---|
| *C10G 55/02* | (2006.01) |
| *C10G 9/38* | (2006.01) |
| *C10G 11/20* | (2006.01) |
| *C10G 7/00* | (2006.01) |
| *C10L 3/00* | (2006.01) |
| *B01D 19/00* | (2006.01) |

(52) U.S. Cl.
CPC ......... *C10G 55/02* (2013.01); *B01D 19/0005* (2013.01); *C10G 7/00* (2013.01); *C10G 9/38* (2013.01); *C10G 11/20* (2013.01); *C10L 3/00* (2013.01); *C10G 2300/4006* (2013.01); *C10G 2300/4081* (2013.01); *C10L 2270/04* (2013.01); *C10L 2290/543* (2013.01)

(58) Field of Classification Search
CPC ....... C10G 7/00; C10G 31/00; B01D 19/0005
See application file for complete search history.

(56) References Cited

U.S. PATENT DOCUMENTS

| | | | |
|---|---|---|---|
| 1,594,957 A | | 8/1926 | Howard et al. |
| 3,637,485 A | * | 1/1972 | Salka ............... C10G 31/00 208/211 |
| 4,014,780 A | | 3/1977 | McCoy |
| 6,413,414 B1 | * | 7/2002 | Arnold ............... C10G 7/003 208/30 |
| 2002/0068768 A1 | | 6/2002 | Wallace et al. |
| 2008/0099372 A1 | | 5/2008 | Annamalai et al. |

FOREIGN PATENT DOCUMENTS

EP    186 617    *   7/1986   ............... C10G 7/00

* cited by examiner

*Primary Examiner* — Renee Robinson
(74) *Attorney, Agent, or Firm* — Bennett Jones LLP

(57) ABSTRACT

Non-condensable gas is used as an alternate to steam at hydrocarbon processing facilities removing any steam requirements thereby reducing greenhouse gas emissions, and improving profitability through capital and operating cost reductions. The non-condensable gas serves at least two functions sequentially in heavy hydrocarbon processing; firstly, providing the non-condensable gas as a stripping medium to evolve lighter hydrocarbons from the heavy hydrocarbon feedstock followed by secondly directing the same non-condensable gas and any evolved non-condensable gas at operating conditions for use as at least one of heat through combustion or power through electricity generation.

8 Claims, 2 Drawing Sheets

STEAMLESS HYDROCARBON PROCESSING (UPGRADING) FACILITY WITH MULTIPLE AND INTEGRATED USES OF NON-CONDENSABLE GAS FOR HYDROCARBON PROCESSING

FIELD OF THE INVENTION

The present invention relates to operating the process of a hydrocarbon processing facility such as a refinery, heavy oil upgrader or petrochemical production plant without steam. Still more particularly the present invention employs a non-condensable gas in an integrated fashion as an alternate to steam in order to provide some, all or more features ordinarily provided by steam in a hydrocarbon processing facility but at a greatly reduced capital cost, operating cost and environmental footprint.

Hydrocarbon processors, such as refiners, heavy oil upgraders and petrochemical plants, have been challenged to make a profit while providing improved environmental performance. In hydrocarbon processing, and specifically refining of crude oils, the use of steam has been engrained into the basic design of the hydrocarbon processing complex since the first refinery. Steam provides multiple uses including the initial motivation for steam use at a crude oil refinery, motive force for power generation to power pumps in hydrocarbon processing facilities. With the availability of steam at the processing facility, steam has been applied to provide indirect heat transfer to the hydrocarbon to capture waste heat, provide increased velocity for the process fluid, known as velocity steam, through specific piping to mitigate coke formation and to also act as a stripping medium for hydrocarbon separation. Stripping with steam reduces the heat required to promote flashing at a given temperature and pressure by reducing the partial pressure of hydrocarbon in flash zone essentially reducing the flashing pressure of the hydrocarbon.

The steam eventually is condensed, and of course, gives up its latent heat of vaporization and ideally to the oil; however, the resultant increase in heat is of negligible practical effect when compared with the substantial investment required to generate the steam, separate out the water, treat the water and recycle for re-vaporisation of water to steam. With the greenhouse gas emissions created from the combustion of natural gas to generate steam included in the cost-benefit decision process to use steam in a refinery, both economic and environmental benefits can be created applying alternates such as non-condensable gas to replace the many uses of steam in a hydrocarbon processing facility.

Prior Art

U.S. Pat. No. 1,594,957 shares an improvement in the art of steam distillation, for example, of petroleum or hydrocarbon oils immiscible with water either by steam alone or by steam conjointly with fire or other heat source. As patent #957 shares it has been well known in the art for a long time to use steam to enhance hydrocarbon separation and this is the standard vapour to use in these applications.

U.S. Pat. No. 3,637,485 involves a process where the reactor effluent from a hydroconversion process is passed directly to an effluent stripper, components, hydrogen and light hydrocarbons are stripped by passing a hydrogen-rich gas stream through the stripper in countercurrent flow to said effluent and the hydrogen and light hydrocarbons from the effluent stripper are then passed to a feed stripper to strip oxygen eluant from the hydrocarbon feed which is utilized in the hydroconversion process. This patent incorporates the use of a non-condensable gas that contains components that are a necessary part of the hydroconversion process differing from the integration and use of the non-condensable gas in the present invention.

U.S. Pat. No. 4,014,780 shares a process for deoiling and dewatering refinery sludges in which sludges, optionally mixed with a diluent oil such as recycle oil recovered in the process, are contacted in a heating zone with steam or superheated steam to effect separation of the sludges into dry, oil-free, free-flowing solids and an oil-water vapor phase which, on condensation, yields a mixture of oil and water. Patent #780 provides an example of steam use for stripping with heavy oils.

US patent application 20020068768 involves the use of an inert gas on a hydrotreated liquid containing volatile hydrocarbons, hydrogen, and contaminants such as hydrogen sulfide. An inert gas, preferably nitrogen, is used to strip volatiles from the hydrotreated liquid. This stripper gas is then added to fuel gas fed to a combustion turbine, where combustibles in the fuel gas and stripper gas are combusted. The stripping is at a pressure sufficient to allow the stripper gas, now containing hydrocarbons and hydrogen, to be added to the combustion turbine fuel without additional compression. This process allows for efficient use of the stripped combustibles, and the nitrogen added to the fuel gas provides increased power generation from the combustion turbine and reduces NOx emissions. This application applies nitrogen for stripping of combustibles to create a mixture for feed to a combustion turbine, so steam is not applied but the challenge with this chosen inert gas is that it is not normally used in another part of the process and it doesn't contribute to the actual combustion increasing the cost and complexity of the process. The claims filed in application #8768 include fuel gas but at pressures above 100 psig and temperatures between 100-250° F.

In the past and in current prior art it has been the primary practice in hydrocarbon processing facilities to use steam to power rotating equipment, serve as a stripping medium in flashing, act as a supplementary velocity fluid, and perform indirect heat transfer. It is not believed that a hydrocarbon processing facility without steam employing an integration of non-condensable gases as is done according to the process of the present invention exists.

SUMMARY OF THE INVENTION

Figure 1:
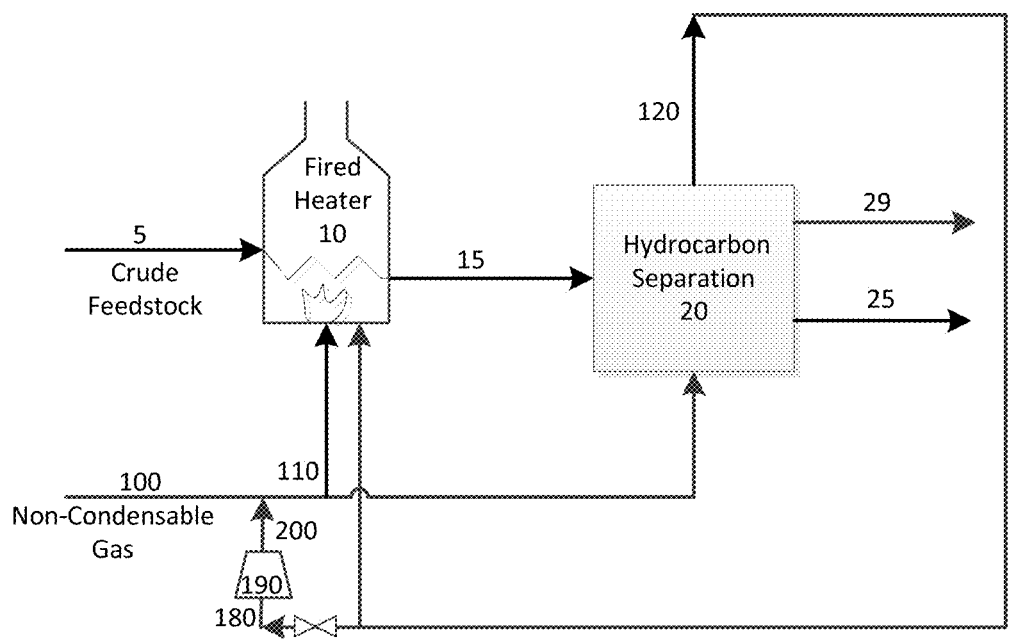
FIG. 1 is a simplified flow diagram showing a hydrocarbon facility's basic process units in an embodiment of this invention, using non-condensable gas in lieu of steam as both a stripping medium and a combustion fuel to provide heat to the process.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly the drawings and detailed description are to be regarded as illustrative in nature and not as restrictive.

A process that includes at least one of hydrocarbon separation and hydrocarbon conversion that uses non-condensable gas instead of steam to serve at least as one of a stripping medium, velocity fluid, combustion fuel, power generation with or without heat transfer included in the process to eliminate the use of steam in conventional similar processes enhancing overall energy efficiencies and reducing greenhouse gas emissions.

In an embodiment, a process is provided for a heavy hydrocarbon processing operation that uses a non-condensable gas at operating conditions as a stripper gas, with the following process steps: providing a hydrocarbon liquid to a hydrocarbon treatment and separation vessel which is a stripper at a low pressure and elevated temperature; contacting the hydrocarbon liquid with stripper gas, thereby transferring at least a portion of volatile hydrocarbons in the hydrocarbon liquid to the stripper gas; removing the combined stripper gas and volatile hydrocarbons from the stripper; separating the stripper gas and the volatized hydrocarbons removed from the hydrocarbon liquid by condensing the volatized hydrocarbons; and conveying and recycling the non-condensable recovered stripper gas for reuse as the stripper gas in step b) as required.

In a preferred embodiment, that process uses non-condensable gas to strip and as a fuel gas to generate heat and/or power with the following added steps: conveying the separated stripper gas and any remaining volatized hydrocarbons to a fuel gas header for distribution as fuel; and one or more of: combusting the fuel as gas in a fired heater to produce heat which is conveyed to the hydrocarbon liquid; and injecting the fuel as gas into a turbine to generate power and recycle waste heat from the turbine to the process fluid directly; and removal for use in another setting or process as a fuel.

An apparatus is provided in another embodiment for a heavy hydrocarbon processing operation for use of a non-condensable gas at operating conditions as a stripper gas, that comprises a phase-change hydrocarbon separation vessel; fluid management equipment to introduce a stream of heavy hydrocarbon and another stream of a non-condensable gas to the phase-change hydrocarbon separation vessel and treatment equipment associated with the vessel to promote vaporization of desired volatile components of the heavy hydrocarbon within the vessel; fluid management equipment to provide for discharge and collection of vapor from a first location within the vessel, the vapor containing both non-condensable gas and a vaporized portion of the heavy hydrocarbon; and additional fluid management equipment for the discharge of the remaining non-volatized treated liquid from a second and different location within the separation vessel. In addition the apparatus can comprise fluid management equipment to convey the vapors collected from the vessel to further processing equipment to separate the non-condensable gas from the condensable volatized hydrocarbon vapor thus collected; further fluid management equipment can be provided to: convey the condensable hydrocarbon for other use or sale; convey the non-condensable gas back to the vessel for re-use as a stripping gas; or to convey a portion of the non-condensable gas with some or none of the condensable hydrocarbon to a fuel header for further distribution for use as a fuel for power generation, combustion for heating, or other use.

Essentially an improved hydrocarbon processing scheme that does not require either process or heating steam to process hydrocarbons has been developed. Within a hydrocarbon processing facility, a non-condensable gas at operating conditions to sequentially strip and generate heat for a heavy hydrocarbon processing operation is integrated into the facility by providing a hydrocarbon liquid to a stripper at a low pressure and elevated temperature, contacting the hydrocarbon liquid with a stripper gas, thereby transferring at least a portion of the volatile hydrocarbons in the hydrocarbon liquid to the stripper gas; separating the stripper gas from the volatized hydrocarbons in the hydrocarbon liquid by condensing the volatized hydrocarbons; conveying said stripper gas and remaining volatized hydrocarbons to a fuel gas header for feed to fired heaters to heat the heavy hydrocarbon liquid or to generate power and heat; combusting said fuel gas in the fired heater to convey heat to the hydrocarbon liquid, or generating electricity and recovering the waste heat directly with the process fluid or recycling the non-condensable gas for reuse as a stripping medium or a combination of all three.

By using an alternate to steam such as a non-condensable gas throughout a hydrocarbon processing facility, capital and operating costs are reduced and greenhouse gas emissions are reduced while the performance of the facility is not compromised.

DETAILED DESCRIPTION

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

The concept illustrated is a novel use and integration of a non-condensable gas to replace the use of steam in hydrocarbon processing facilities such as refineries, heavy oil upgraders and petrochemical plants. FIG. 1 depicts a simple process flow diagram depicting a hydrocarbon separation unit 20 using a fired heater 10. A hydrocarbon stream 5, containing crude oil as an example, is heated in the fired heater 10 to a temperature above the vaporization (flashing) point for a portion of stream 5. The heat is generated from combustion of stream 110 which comprises a non-condensable stream 100 and a recycle of the non-condensable gas stream 200 used as a stripping medium along with any non-condensable material from stream 5. The gas in stream 200 is typically natural gas and can include non-condensable gases generated in the process. The transfer of heat is from both radiant and convection means configured in any state of the art fired heater such as box, cabin or cylindrical vertical.

For a hydrocarbon crude oil stream with components that boil in the range of 90° F. (32.2° C.) to over 1000° F. (538° C.), the heater 10 can heat the crude up to any temperature within the full boiling range to vaporize some of the stream. For example, for a 40 API (0.8251 Specific gravity) hydrocarbon stream with 50% gasoline and lighter material, if the intent is to separate gasoline and lighter material from heavier components, the heater can heat up the material to just over the boiling point of the heaviest gasoline molecule, nominally 395° F. (202° C.) to vaporize a portion (around 15 weight %) of the hydrocarbon stream. The two phase liquid and vapour stream 15 is sent to a hydrocarbon separation unit 20 to separate the hydrocarbon stream into desired separate streams, typically a non-condensable vapour stream, 120, a light condensed liquid stream, 29, and a heavy separated liquid stream, 25. The hydrocarbon separation unit 20 can comprise any means of separation that involves liquid-vapor phase differences in the stream to effect the separation. Some common liquid-phase separation means used are distillation, stripping, and a simple flash drum.

Figure 2:
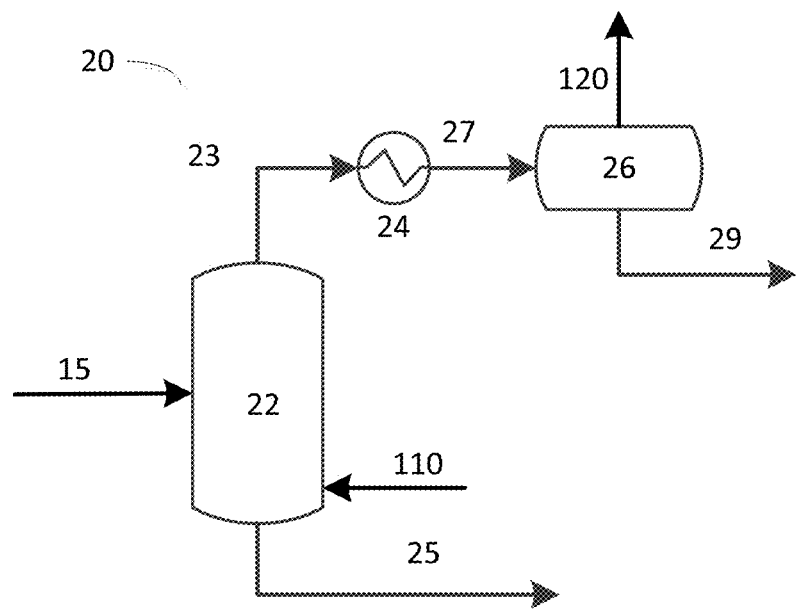
FIG. 2 is a simplified flow diagram showing a hydrocarbon facility with a separation scheme involving a stripping gas.

In a simple embodiment as an example as shown in FIG. 2 a flash drum, 22, with a partial overhead condenser 24, and receiving drum 26, are used to separate the 40 API crude stream noted above which is heated to 395° F. (202° C.). At near atmospheric pressure in the flash drum 22, with no stripping gas in stream 110 around 47 weight % of the material is vaporized as stream 23, leaving 53 weight % as a liquid in stream 25. All the vaporized material in 23 is subsequently condensed in 24 and sent as stream 27 to the receiving drum 26. With no stripping gas, there is typically no vapour material in stream 120 and all the material in 27 which is 47 weight % of stream 15 becomes stream 29 and leaves as a liquid.

Steam is typically applied to the separation to effect improved vaporization, either increasing the quantity vaporized at a given temperature or achieving the same vaporization but at a lower temperature. As a case study using the FIG. 2 configuration as an example, steam, natural gas and nitrogen are injected into the flash drum as stream 110 to determine the impact of adding different stripping gases to the flash drum. Table 1 shares the results with the rate of each molecule used for stripping varied between 5-15 lbs/hr (2.3-6.8 kg/hr) which translates to 2-7 weight % of stream 5. In practice, more stripping gas can be added but the law of diminishing returns holds with more gas needed to make an increasingly small gain in vaporization.

As shown it table 1, when 5 lbs/hr (2.27 kg/hr) of various stripping gases are used, at close to the same temperature as the incoming stream 15, the fired heater needs to heat the fluid to 369° F. (187° C.) for the steam case, 361° F. (183° C.) for natural gas and 381° F. (194° C.) for Nitrogen to obtain the same amount of vaporization at the non-stripping base case of 395° F. (202° C.) from the fired heater. In all cases, the addition of a stripping medium helps with vaporization with natural gas performing just as well as steam in this example. Realistically, natural gas and nitrogen will not be heated to the temperature of the feed stream due to the poor heat transfer capability for gases versus liquids so a scenario in table 1 includes stripping gas temperatures from the non-steam options to be closer to ambient conditions. With the adjustment for stripping gas temperature, natural gas as a stripping medium is still comparable to steam while nitrogen is less effective than steam or natural gas.

Steam temperature is important so as not to counter the effects of the heat transfer from the fired heater with steam typically superheated above the separation vessel temperature when used as a stripping medium so that the impact of the latent heat of condensation (vaporization) is not realized. This requirement for elevated steam stripping temperature adds another cost consideration for steam use. That is to say, the added cost of overheating the steam past process energy requirements due to other reasons such as to prevent premature condensation in steam delivery systems to the various processes, may be avoided.

TABLE 1

Comparison of steam vs natural gas vs nitrogen stripping with a constant vaporization of 47 weight % at 22 psia (151.7 kPa).

| Flow Rate lbs/hr (kg/hr) | Steam ° F. (° C.) | Natural Gas ° F. (° C.) | Natural Gas ° F. (° C.) | Nitrogen ° F. (° C.) | Nitrogen ° F. (° C.) |
|---|---|---|---|---|---|
| 0 | 395 (202) | 395 (202) | 395 (202) | 395 (202) | 395 (202) |
| 5 (2.27) | 369 (187) | 361 (183) | 369 (187) | 380 (193) | 381 (194) |
| 10 (4.54) | 312 (156) | 293 (145) | 311 (155) | 352 (178) | 359 (181) |
| 15 (6.82) | 250 (121) | 217 (103) | 246 (119) | 314 (157) | 325 (163) |
| Temperature (° F./° C.) of stripping gas | 400 (204) | 400 (204) | 60 (16) | 400 (204) | 60 (16) |

Adding a stripping gas such as steam is important in heavy hydrocarbon systems where cracking temperatures tend to be lower than the desired vaporization temperature. The steam allows more vaporization at temperatures below cracking. However, as more steam is added, the size of the steam generation and processed water equipment increases. As shown in table 1, natural gas provides similar benefits to steam without the requisite capital and operating costs.

With natural gas as a stripping medium in stream 110, a non-condensable product stream 120 results since natural gas will not normally condense and is not desired to condense in this application. Stream 120 includes the stripping natural gas along with a small portion of the lightest components of stream 15 due to the equilibrium between the liquid and vapour phases. Stream 120 can be sent directly to appropriately designed burners to a fired heater 10 or any other combustion equipment enabling the dual use of the non-condensable gas.

Figure 3:
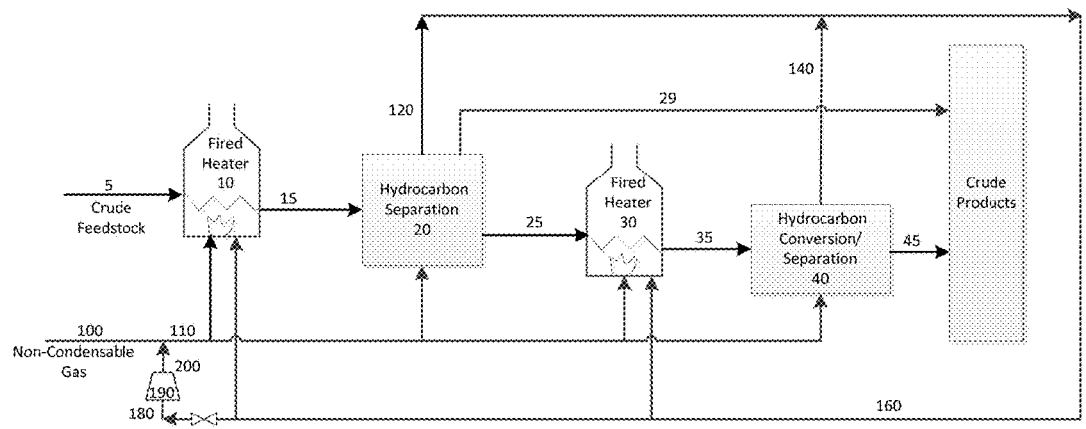
FIG. 3 is a simplified flow diagram showing a hydrocarbon facility using non-condensable gas in lieu of steam as both a stripping medium and a combustion fuel to provide heat to the process.

In another embodiment as shown in FIG. 3, all of stream 120 or a portion of it can be diverted to stream 180 to be compressed in unit 190 compressor creating stream 200, if pressure uplift is necessary, that can be recycled in the fuel gas header or directed to the non-condensable feed line 100 for reuse as a stripping medium. Prior to entrance to the fuel gas header, some of the heavier molecules can be condensed and removed. FIG. 3 illustrates the application of applying the present invention, dual use of non-condensable gas removing the need for process steam throughout a hydrocarbon processing facility. Stripping gas as stream 110 is provided to all operations such as hydrocarbon separation, 20, hydrocarbon conversion and any combination of hydrocarbon conversion and separation, 40. The product non-condensable vapour streams, 120 and 140, are combined into stream 160 where all or parts of this stream can be used as combustion material in the fired heaters 10 and 30 or can be recycled via a compression unit, 190, for re-use as a stripping medium again. The non-condensable gases generated in units 20 and 40 may be sufficient that the requirement for sustained non-condensable gas supply (stream 100) is not always needed. On the hydrocarbon processing side, as shown in FIG. 3, the target hydrocarbon feedstock is fed to the facility as stream 5 where it is heated up in a fired heater, 10, exiting at an elevated temperature as stream 15. Stream 15 is processed in a separation unit, 20, with the use of the non-steam stripping medium in stream 110 to create the desired vapour and liquid separation products. The produced hydrocarbon liquid in 20, stream 25 is sent to a fired heater 30, in preparation for a conversion step. Stream 35 leaves the fired heater, 30, at an elevated temperature and is fed to unit 40 where stream 110 is used to complement any combination of conversion and separation. The produced liquid stream 45 can then be sent to final product preparation/blending.

Table 2 shares a comparison of the key parameters for steam and a non-condensable gas, such as natural gas, in a hydrocarbon facility. As noted in the table, when used as both a stripping and heat transfer medium, natural gas provides similar to better performance than steam while not requiring the capital and operating expenditures for the steam generation and handling in a conventional hydrocarbon facility. In addition, the complexity of the facility is reduced when natural gas is used since it can be sent directly to the fuel gas header. Both steam and nitrogen need to be separated from any non-condensable vapour generated in the process since these molecules cannot be used for direct combustion in any appreciable quantities.

TABLE 2

Comparison between Steam and non-condensable gas use in a hydrocarbon facility.

| | Stripping | Heat Transfer | Special Facilities Required |
|---|---|---|---|
| Steam | Typically superheated steam. Reduces hydrocarbon partial pressure. | Indirect typically using saturated steam. Maximum temperature at 705° F. critical point | Steam boiler Condenser Sour water stripper Water treatment |
| Non-condensable Gas (ex. methane as Natural Gas) | Reduces heavier hydrocarbon partial pressure. | Indirect through combustion well above maximum steam temperature. | None |

Figure 4:
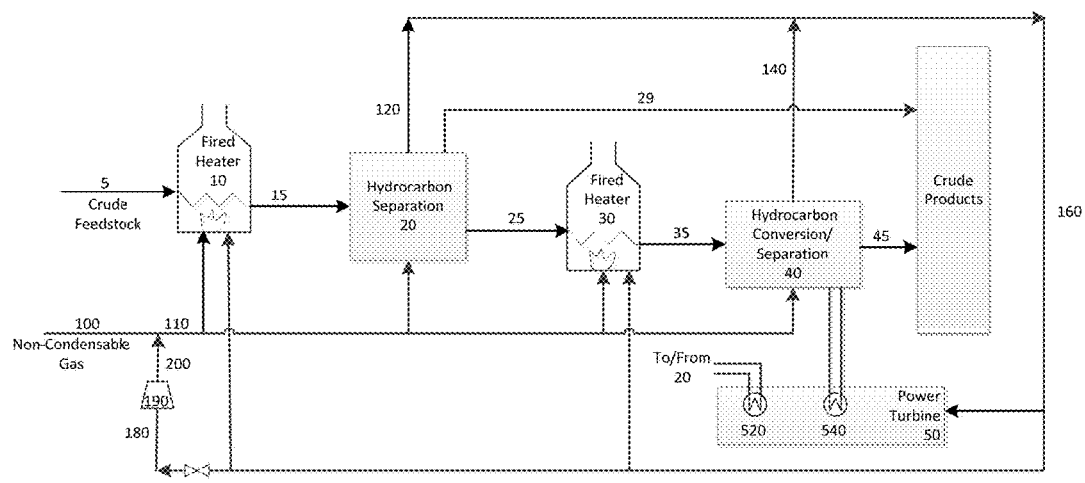
FIG. 4 is a simplified flow diagram showing a hydrocarbon facility using non-condensable gas in lieu of steam as one of at least a stripping medium, a combustion fuel to provide heat to the process and to generate power in a turbine for the process with heat integration levels with the process.

In a further embodiment as shown in FIG. 4, the non-condensable gas stream 160 can also be partially or fully used to generate electricity in unit 50 to power rotating equipment (turbine, other engines) or other power generation means in a hydrocarbon processing facility such as a crude refinery, bitumen upgrader, or petrochemical facility. As an example, Unit 50 can be a gas turbine with the basic operation similar to that of the steam power plant except that the working fluid is air instead of water. Fresh atmospheric air flows through a compressor that brings it to higher pressure. Energy is then added by the non-condensable fuel into the air and igniting it so the combustion generates a high-temperature flow. This high-temperature high-pressure gas enters a turbine, where it expands down to the exhaust pressure, producing a shaft work output in the process. The turbine shaft work is used to drive the compressor and other devices such as an electric generator that may be coupled to the shaft. The energy that is not used for shaft work comes out in the exhaust gases, so these have either a high temperature or a high velocity. As an added feature to recover the high temperature waste heat from the turbine without generating steam, direct heat exchange with the process fluid using single/multi-stream heat recovery and exchange equipment 520 and 540 can be employed.

The facilities required to generate steam, separate the condensed steam and clean the water for re-use increase the environmental impact with increased $CO_2$ created. With natural gas used in lieu of steam, the amount of $CO_2$ avoided is the quantity of natural gas not burned to generate steam and the electrical power to operate these processes. Nominally, 117 lbs $CO_2$/mmbtu (50 k g $CO_2$/GJ) is generated for the combustion of natural gas to vaporize water to create steam for stripping. As an example for a 100,000 barrel per day (15,900 m3/day) heavy oil refinery that generates 75 lbs of steam per barrel of feed (214 kg steam/m3 of feed), removing the steam generation facility translates to 140 kTonnes/yr of $CO_2$ avoidance.

What is claimed is:

1. A process for a heavy hydrocarbon processing operation that uses a non-condensable gas at operating conditions, with the following process steps:
   a) providing a hydrocarbon liquid to a hydrocarbon treatment and separation vessel which is a stripper at a low pressure and elevated temperature
   b) contacting the hydrocarbon liquid with the non-condensable gas as a stripper gas, thereby transferring at least a portion of volatile hydrocarbons in the hydrocarbon liquid to the stripper gas;
   c) removing the combined stripper gas and volatile hydrocarbons from the stripper;
   d) separating the stripper gas and the volatized hydrocarbons removed from the hydrocarbon liquid by condensing the volatized hydrocarbons; and
   e) recycling at least some non-condensable recovered stripper gas for reuse;
   f) providing the hydrocarbon liquid to a conversion vessel which is a reactor at temperature in the cracking range for hydrocarbons in the hydrocarbon liquid, and introducing the non-condensable gas as a heat exchange medium, or as a velocity fluid to the reactor, and as a stripping gas to assist removal of volatile conversion products of the hydrocarbon conversion reaction from the reactor in a vapor phase; and
   g) removing the non-condensable gas and volatile hydrocarbon conversion products from the reactor.

2. The process of claim 1 using non-condensable gas in steps b and f, and as a fuel gas to generate heat and/or power, with the following added steps:
   h) conveying at least some of the separated stripper gas and some volatized hydrocarbons to a fuel gas header for distribution as fuel; and
   i) one or more of:
      i. combusting the fuel as gas in a fired heater to produce heat which is conveyed to the hydrocarbon liquid; and
      ii. injecting the fuel as gas into a turbine to generate power and recycle waste heat from the turbine to the process fluid directly; and
      iii. removal for use in another setting or process as a fuel.

3. The process of claim 2 where stripping is performed at pressures less than the critical point of the volatile hydrocarbon component and combustion is performed at or near atmospheric pressure.

4. The process of claim 1 where the non-condensable gas is any hydrocarbon that is a vapour at operating conditions.

5. The process of claim 1 where non-condensable gas is commercially available natural gas that contains methane as a key component.

6. The process of claim 1 where stripping is performed at temperatures above the boiling point of the lightest components in the hydrocarbon liquid feedstock while in the presence of the stripper gas.

7. The process of claim 1 where the stripping is performed at or above 400° F. (204.4° C.) and below 650° F. (343.3° C.).

8. The process of claim 1 where the stripping is performed at or above 400° F. (204.4° C.) and at temperatures low enough to prevent cracking of heavier hydrocarbons.

\* \* \* \* \*